Figure 1:
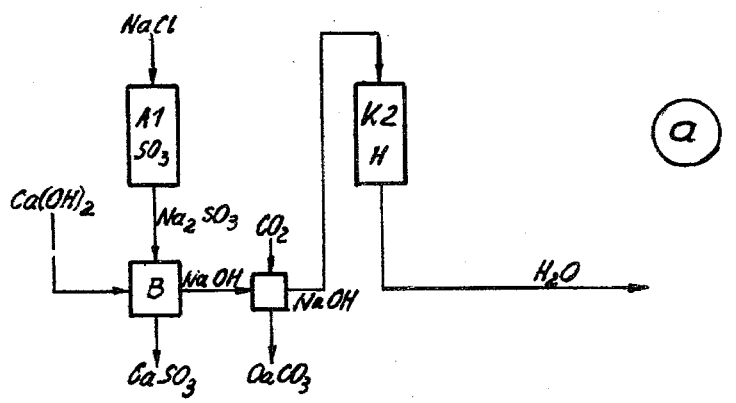
Figure 1:
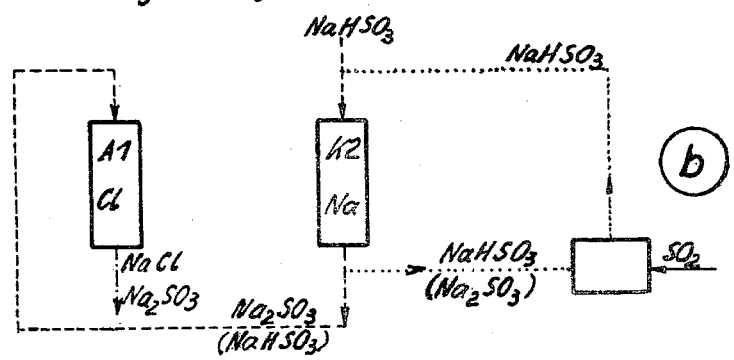
Figure 1:
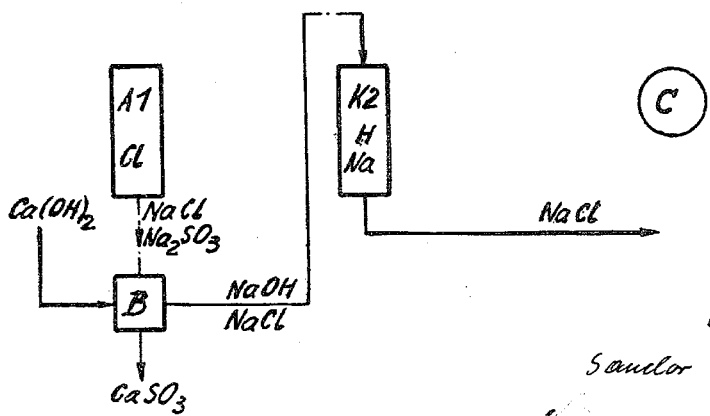

June 1, 1965 S. VAJNA 3,186,940
ION EXCHANGE METHOD
Filed July 25, 1961 5 Sheets-Sheet 1

(a)

(b)

(c)

INVENTOR
Sandor Vajna
by Michael S. Striker
Attorney (a)

(b)

(c)

INVENTOR
Sandor Vajna
by Michael S. Striker
Attorney

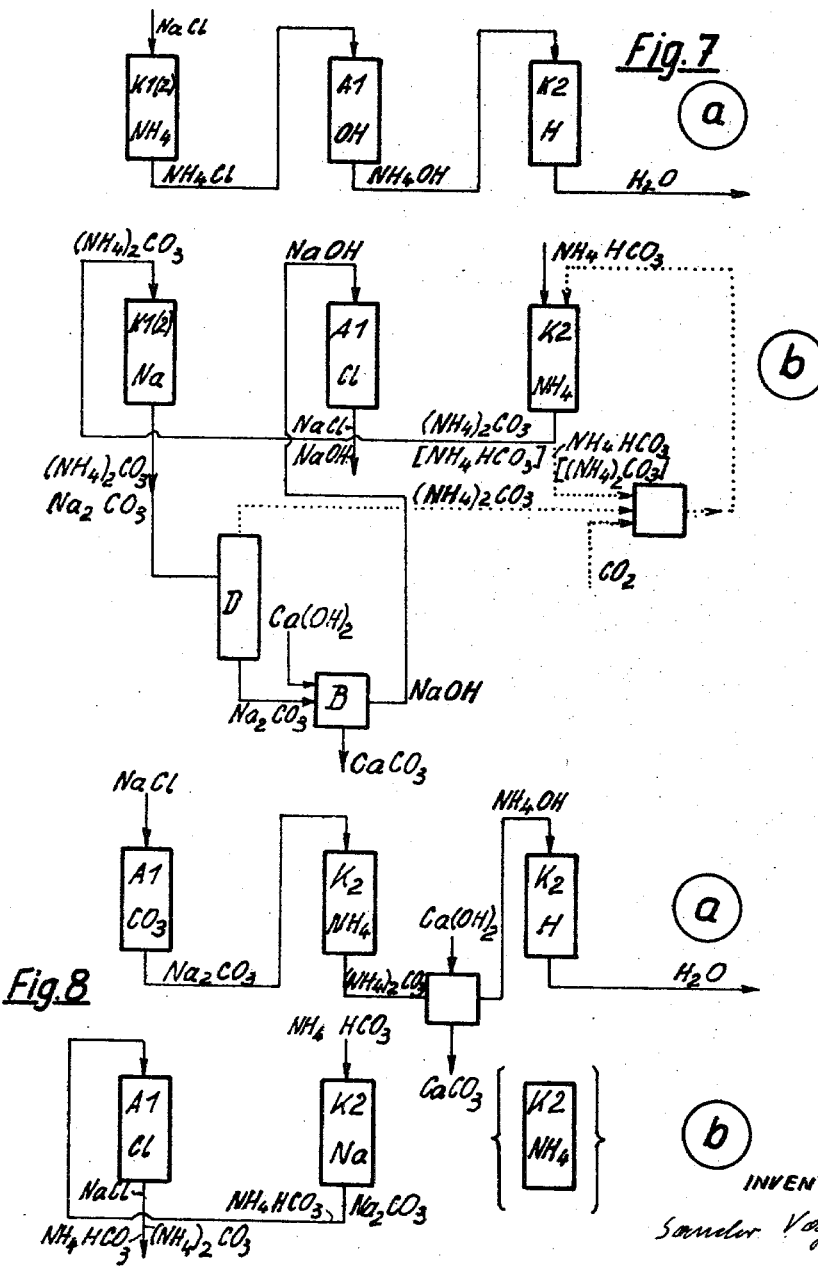

3,186,940
ION EXCHANGE METHOD
Sandor Vajna, Girardet-Allee 15, Bad Honnef, Germany
Filed July 25, 1961, Ser. No. 128,628
Claims priority, application Germany, July 27, 1960,
V 19,062
17 Claims. (Cl. 210—30)

The present invention relates to an ion exchange method and device and, more particularly, the present invention is concerned with certain ion exchange media and the use of the same in such a manner that the desalting of aqueous solutions and the regeneration of the cation and anion exchangers is facilitated.

Desalting of aqueous solutions by ion exchange is conventionally carried out by replacing the ions of the aqueous solution with hydrogen and hydroxyl ions which will combine under formation of water. According to other methods, the ions of the solution are exchanged against ammonium and either carbonate or hydroxyl ions so that either ammonium carbonate or ammonium hydroxide is formed which can be easily driven off the solution.

The ion exchangers used in these processes must be regenerated with suitable acids and hydroxides or ammonium salts or bases. The relatively high costs of the chemicals required for regeneration of the ion exchangers frequently render these methods uneconomical, notwithstanding the fact that from a purely technological point of view the desired result could be advantageously achieved by ion exchange methods.

In order to reduce the costs of regeneration of the ion exchangers, it has been proposed to carry out such process, in its acid cycle, with several exchangers arranged in series. Furthermore, it has been proposed to carry out only an incomplete regeneration of the exchangers in order to more fully utilize the chemicals used for this purpose. However, only partial desalting can be accomplished in this manner. According to another suggestion, the strongly active, i.e., strongly acid or alkaline exchangers are replaced with less active, i.e., only slightly acid or alkaline exchangers which require a lesser amount of chemicals for their regeneration. For the ammonium cycle, a circular flow was devised for recovery of the initially introduced ammonia, or for producing the hydroxide required for regeneration from ammonium carbonate.

In the case of the acid ion exchange process, it was found that the lower limit of consumption of chemicals for the regeneration of the ion exchangers was somewhat more than a quantity equal to the chemical equivalent of the compounds which were to be removed from the aqueous solution, however, when operating at such lower limit of consumption of regenerating chemicals, it was not possible to achieve complete desalting of the aqueous solution. Furthermore, the costs of the regenerating chemicals frequently were still too high for achieving the desired result in an economical manner. The ammonia process, wherein the chemicals pass in a circular flow, will result in a considerable reduction of the costs of regenerating chemicals, however, this process requires large quantities of steam and a rather complicated apparatus.

It is therefore an object of the present invention to overcome the above discussed difficulties and disadvantages of conventional ion exchange methods.

It is a further object of the present invention to provide an ion exchange method which can be carried out in a simple and economical manner.

It is another object of the present invention to provide an ion exchange method for the desalting of aqueous solutions which will achieve the desired result with respect to the desalting of the solution with a very low outlay for regenerating chemicals.

Other objects and advantages of the present invention will become apparent from a further reading of the description of the appended claims.

With the above and other objects in view, the present invention contemplates in an ion exchange process for at least partially desalting a salt-containing aqueous solution by replacing anions of the aqueous salt solution with hydroxyl ions, and cations of the aqueous solution with hydrogen ions, and for regenerating the cation and anion exchangers used therefor, the steps of passing a substance selected from the group consisting of polyvalent acids and acid salts thereof through a cation exchanger so as to replace therein cations with hydrogen ions thus regenerating the cation exchanger and forming a solution containing the thus replaced cations, passing the thus formed cations-containing solution through an anion exchanger so as to replace therein anions with polyvalent acid ions thus regenerating the anion exchanger, passing the salt-containing aqueous solution through the regenerated anion exchanger so as to replace the anions of the salt-containing solution with ions of the polyvalent acid, and treating the ions of the polyvalent acid-containing solution derived from the anion exchanger with an hydroxide of an alkaline earth metal so as to precipitate an alkaline earth metal salt of the polyvalent acid and to replace in the solution polyvalent acid ions with hydroxyl ions.

According to the method of the present invention, the costs of regenerating the ion exchanger is reduced by cycling the various solutions in a certain manner and also by producing the chemicals employed in the regeneration of the exchangers during the process. This is accomplished concurrently with carrying out the desalting of the aqueous solution to the desired extent, i.e. either substantially completely or partially.

According to the present invention, the cation exchanger is regenerated with a polyvalent acid or its acid salts, and the solution leaving the thus regenerated cation exchanger is then used for regeneration of the anion exchanger. It is possible thereby either immediately to use the solution leaving the cation exchanger for regeneration of the anion-exchanger so that during subsequent use of the anion exchanger the anions of the salt-containing solution will be replaced by polyvalent acid ions which in turn are replaced by hydroxyl ions upon adding alkaline earth metal hydroxides; or the anions of the solution leaving the regenerated cation exchanger are replaced by hydroxyl ions upon addition of alkaline earth metal hydroxides and the thus formed lye is then used for regenerating the anion exchanger so that the anions of the solution which is to be desalted will be exchanged for hydroxyl ions.

Thus, the solution required for regenerating the anion exchanger will be produced during operation of the process and the cations of the solution which is to be desalted will be employed for this purpose. The only chemical which still must be supplied and which will be consumed is the alkaline earth metal hydroxide.

In either case, in the manner described above, the anions of the solution which is to be desalted will be replaced by hydroxyl ions. Thus, the monovalent cations will be present in solution in the form of their hydroxides and will be removed by passage of the solution through a hydrogen ion-charged cation exchanger. Since, as described above, the solution which is passed through the cation exchanger always will be an alkaline solution, the cation exchanger may be either strongly or only very slightly acid.

It is required to use an excess of regenerating chemicals for the regeneration of the anion exchanger. According to the present invention, such excess is recovered after completion of the regeneration. By using a salt of a polyvalent acid for regeneration of the anion exchanger, the solution obtained thereby is then causticized and passed through the cation exchanger prior to regeneration of the latter. If a hydroxide is used for regenerating the anion exchanger, then the solution leaving the anion exchanger may be passed directly through the cation exchanger prior to regeneration of the same. In both cases, the base is bound by the cation exchanger.

The quantity of chemicals in excess of that stoichiometrically required for regeneration of the anion exchanger depends on the specific characteristics of the anion exchanger. Since such excess quantity of chemicals is obtained in the form of salts of polyvalent acids upon regeneration of the cation exchanger, the latter must have a working capacity which is greater than the capacity required for the desalting of the salt-containing solution. Preferably, the cation exchanger is divided into two parts or portions, one of which serves for desalting and the other for binding excess alkali hydroxides from the spent regenerating solution of the anion exchanger.

In order to regenerate the cation exchanger as completely as possible and, on the other hand, to re-use the excess of chemicals required for this purpose, the present invention also contemplates to separate the spent regenerating solution leaving the cation exchanger into a first fraction containing an amount of alkali corresponding to the working, i.e. desalting, capacity of the cation exchanger, and into a residual fraction which by adding fresh polyvalent acid may be reconverted into regenerating solution.

Preferably, for the purposes of the present invention, carbonic acid, sulfurous acid, sulfuric acid or phosphoric acid are used as polyvalent acids. These acids form with alkaline earth metal ions more or less difficultly soluble salts and thus make it possible to produce alkali metal hydroxides by reacting a solution of alkali metal salts of the polyvalent acids with the hydroxide of an alkaline earth metal.

When using, according to the present invention, polyvalent anions as described above, it will be necessary to remove polyvalent cations from the crude salt solution prior to desalting of the same. Such polyvalent cations, if present in the crude salt solution may be exchanged against monovalent cations or precipitated from the crude solution in accordance with well known conventional methods.

The present invention also contemplates the passing of the nearly neutral solution of salts which were removed from the crude salt solution, through an anion exchanger for the removal of coloring materials and similar substances, and/or for regeneration of the exchanger which is employed for the removal of polyvalent cations.

It is a further advantage of the present invention that it is possible to drive off carbon dioxide from the precipitate formed by causticizing and to re-use the thus formed carbon dioxide. Simultaneously, upon driving off carbon dioxide from the alkaline earth metal carbonates, the hydroxides of the alkaline earth metals are recovered. It is also possible to decompose sulfites and sulfates in accordance with conventional chemical processes, such as treatment with acids, heating in the presence of carbon or silicic acid, and the like, and to re-use the decomposition products.

It is particularly advantageous to use the method of the present invention for the treatment of unpurified solutions such as crude juices, for instance in the production of beet sugar, or crude water, which contains colloids or other suspended impurities.

For instance, up to now, crude sugar juices were treated with lime and carbon dioxide in order to change the colloidal constituents of the juice into a filterable form. Only after suspended impurities had been thus removed, was it possible to further purify the solution by ion exchange. According to the present invention it is possible, for instance, to introduce carbonate ions into the crude juice by ion exchange and without causing precipitation. During the subsequent causticizing according to the present invention, lime will be precipitated together with the colloids which then can be removed jointly with the thus formed calcium carbonate. The resulting clear solution may then be further desalted by cation exchange. In order to cause additional chemical reactions in the sugar juice, such as destruction of invert sugar or amides, preferably the amount of calcium hydroxide is correspondingly increased and the remaining excess removed with carbon dioxide.

The method of the present invention may also be advantageously employed for the desalting of crude aqueous solutions which contain polyvalent cations. These polyvalent cations must be removed prior to the desalting according to the present invention and this can be accomplished by treatment with sodium carbonate or similarly acting chemicals and subsequent precipitation and filtration, or by exchange of the polyvalent cations against alkali metal ions, like in the conventional water softening processes.

Since however, according to the present invention, alkali metal salts of a polyvalent acid are formed as an intermediary product, such salts may be used for precipitating polyvalent cations of the crude salt solution. For this purpose, a quantity of the solution leaving the anion exchanger is recycled to subsequent portions of the untreated crude salt solution, while the remainder of the solution leaving the anion exchanger is further processed as described above. The quantity which is recycled will correspond to the amount of polyvalent cations which is to be precipitated from the crude salt solution. Previously obtained precipitates such as are formed for instance during causticizing may be admixed, and thereby crystallization and precipitation will be accelerated. Apart from thus removing polyvalent cations from the crude salt solution, the process is then carried out as described further above.

The method of the present invention allows for many combinations of strong and slightly acid cation exchangers with strong and slightly basic anion exchangers. Polystyrene sulfonic acid may be used as a strongly acid cation exchange resin, polyacrylo carboxylic acid may be used as slightly acid exchange resin, or as a very slightly acid exchange resin a polyphenol with an insoluble skeleton or a polystyrene-phosphoric acid may be employed. Tetra-substituted amino polystyrene may serve as an example of a strongly basic anion exchange resin, while a polyamide may serve as a slightly basic anion exchange resin. The specific resins are mentioned by way of example only.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1–8 are schematic illustrations of various modifications of the process of the present invention.

In all figures of the drawing, the strongly basic anion exchanger is identified as A1, the slightly basic anion exchanger as A2, the strongly acid cation exchanger as K1 and the slightly acid cation exchanger as K2. The causticizing device is identified as B.

Referring now to the drawing, and particularly to FIG. 1, it will be seen that the process according to FIG. 1 is subdivided into three parts identified as *a*, *b* and *c*. Part *a* of FIG. 1 illustrates the desalting of the crude salt solution, part *b* the subsequent regeneration of the exchangers, and part *c* the intermediate treatment of the cation exchanger prior to its regeneration, all in connection with the desalting of a sodium chloride solution or the like, for instance sea water.

Anion exchanger A1 is charged with sulfite ions and exchanges the same against the chlorine ions of the solution. The sodium sulfite-containing solution leaving the anion exchanger is causticized at B with calcium hydroxide, and prior to being introduced into slightly alkaline cation exchanger K2, carbon dioxide is added to the solution. The calcium carbonate which is thus precipitated is then separated from the solution. Cation exchanger K2 binds the sodium ions of the thus treated solution which then leaves cation exchanger K2 as desalted water.

As shown in part $b$ of FIG. 1, regeneration of ion exchangers A1 and K2 is carried out with sodium hydrosulfite which first is passed through cation exchanger K2 wherein it will take up sodium ions and thus will be transformed into sodium sulfite. The sodium sulfite solution then passes through anion exchanger A1 so that $SO_3$ ions may be taken up by anion exchanger A1.

Part $c$ of FIG. 1 illustrates how the solution which leaves anion exchanger A1 and which contains the excess of sodium sulfite is causticized with calcium hydroxide. The causticized solution passes through cation exchanger K2 prior to regeneration of the same and replaces hydrogen ions of the cation exchanger with sodium ions. The solution which leaves cation exchanger K2 contains the sodium chloride removed from the crude salt solution. The calcium sulfite which accrues during causticizing may be a waste product, or it may be used for the recovery of sulfur dioxide by treating the calcium sulfite with sulfuric acid.

The dotted lines in part $b$ of FIG. 1 serve to indicate that for regenerating cation exchanger K2 a large excess of sodium hydrosulfite is used and that from the resulting solution only the first, primarily sodium sulfite-containing fraction is used for regenerating anion exchanger A1, while the residual fraction which primarily contains sodium hydrosulfite is reconstituted by the addition of sulfur dioxide to form fresh regenerating solution.

FIG. 2 is again divided into three parts $a$, $b$ and $c$, similarly to the division of FIG. 1. Anion exchanger A1, for desalting the crude salt solution, is charged with hydroxyl ions so that the chlorine ions of the crude salt solution, upon passage through the anion exchanger A1 will be immediately replaced by hydroxyl ions. The cations of the alkaline solution leaving anion exchanger A1 will be found in cation exchanger K2. In this case, cation exchanger K2 is a particularly slightly acid exchanger the active groups of which, for instance, may be represented by phenolic hydroxyl groups or phosphoric acid residues. The solution leaving cation exchanger K2 is free of salts.

Regeneration of ion exchangers A1 and K2 is carried out by first passing through cation exchanger K2 which now is charged with the sodium ions removed from the crude salt solution, a solution of sodium bicarbonate. The solution leaving cation exchanger K2 is causticized at B with calcium hydroxide and the thus obtained lye is then passed through anion exchanger A1 which had been charged with chlorine ions from the crude salt solution. During causticizing, the precipitated calcium carbonate will be removed and may be reconverted into calcium oxide and carbon dioxide.

Figure 2:
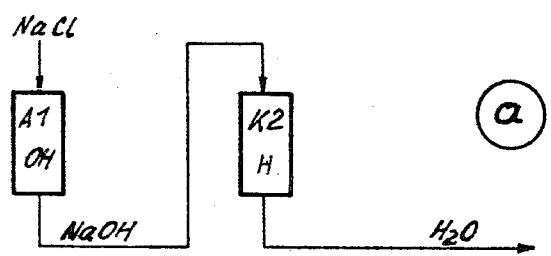
Figure 2:
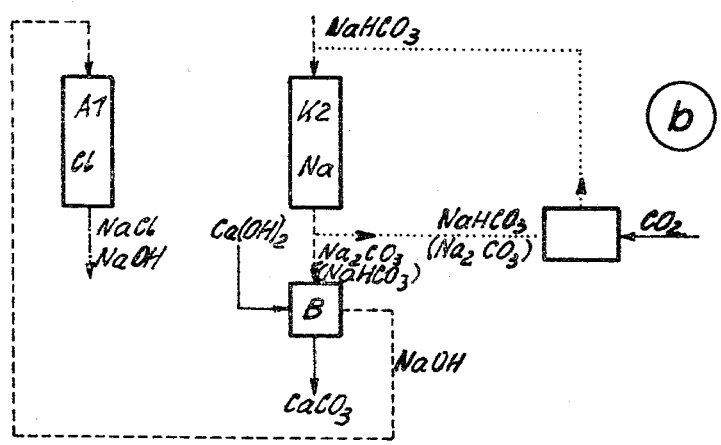
Figure 2:
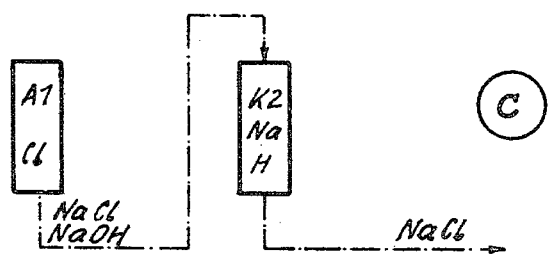

As shown in part $c$ of FIG. 2, the solution leaving anion exchanger A1 and containing excess sodium hydroxide is passed to cation exchanger K2 prior to regeneration of the latter, so that cation exchanger K2 will be charged with sodium ions. The solution leaving cation exchanger K2 contains the salts which were removed from the crude salt solution and this solution may be used for regenerating the exchanger which is employed for the removal of polyvalent cations from the crude salt solution.

The dotted lines in part $b$ of FIG. 2 indicate that the predominantly sodium bicarbonate-containing fraction may be reconstituted to form fresh regenerating sodium bicarbonate solution.

Figure 3:
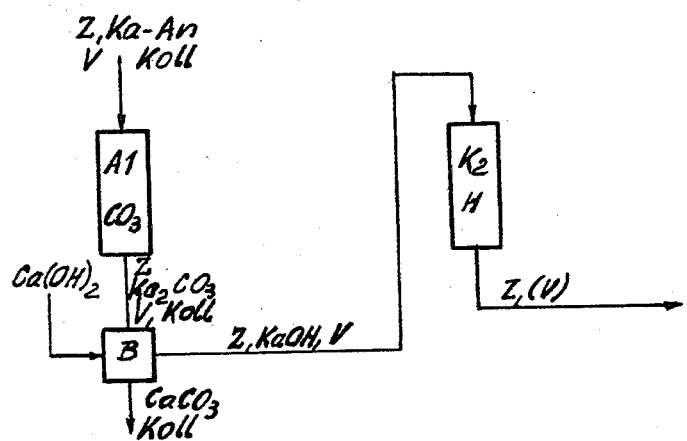

FIG. 3 illustrates the application of the method of FIG. 1 for the desalting of unpurified sugar-containing solutions such as the crude juice obtained in beet sugar manufacturing. The crude juice contains sugar Z, alkali metal ions Ka, anions A, colloids Koll and undissociated compounds V which can be bound only in acid solution.

Anion exchanger A1 is charged with carbonic acid anions. The crude juice passes first through anion exchanger A1 whereby the anions of the crude juice are exchanged against $CO_3$. By the addition of calcium hydroxide to the thus treated juice at B, the alkali carbonate will be causticized and the colloids will be precipitated so that the same can be separated from the solution together with the thus formed calcium carbonate sludge. The thus treated solution now passes through cation exchanger K2 which had been charged with hydrogen ions so that during such passage the juice is freed of cations. Depending on the degree of activity of cation exchanger K2 or the quantitative relationship between juice and exchange resin, a portion of the undissociated compounds V may be retained thereby. Regeneration and intermediate treatment is carried out as described in parts $b$ and $c$ of FIG. 1. For the purpose of destroying undesirable constituents of the juice such as invert sugar or amides, an amount of calcium hydroxide is added at B which is greater than the amount required for causticizing the juice coming from anion exchanger A1. The solution is treated, and the excess calcium hydroxide is removed by precipitation, with carbon dioxide. This treatment may also be carried out after completion of causticizing and removal of the precipitate formed thereby.

Figure 4:
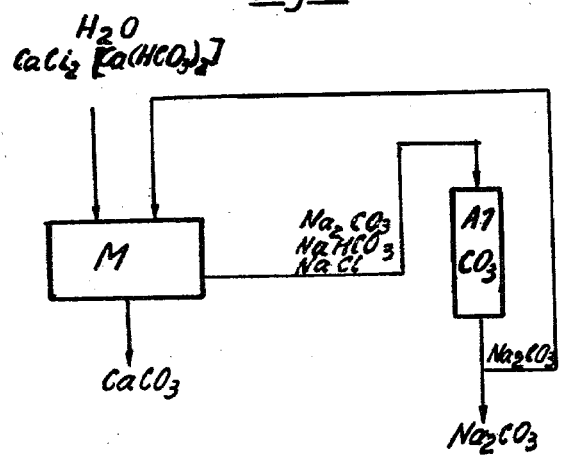

A further application of the method illustrated in FIG. 1 is shown in FIG. 4, according to which crude water is to be desalted. The crude water may contain for instance $Ca(HCO_3)_2$ and $CaCl_2$. The crude water is mixed in mixer M with a portion of the sodium carbonate-containing solution leaving anion exchanger A1. The thus formed calcium carbonate sludge is separated from the solution and the thus treated solution passes through the $CO_3$-charged anion exchanger A1. The solution leaving anion exchanger A1 is divided into two parts of which one part, as described above, is introduced into mixer M while the other part is subjected to causticizing in accordance with FIG. 1.

Figure 5:
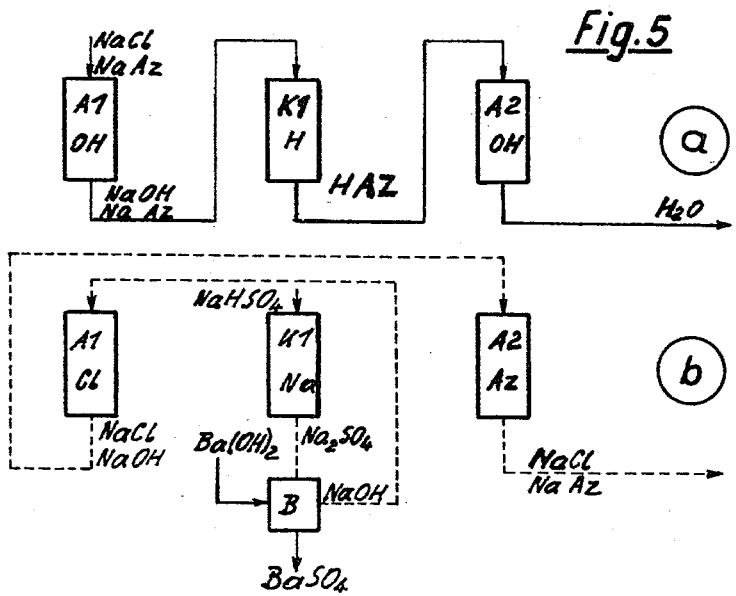

FIG. 5 illustrates a modification of the present invention according to which a strongly basic anion exchanger A1 and a slightly basic anion exchanger A2 are used, both of which initially are charged with hydroxyl ions, while strongly acid cation exchanger K1 is charged with hydrogen ions. Part $a$ of FIG. 5 illustrates the desalting of the crude solution and part $b$ the regeneration of the ion exchangers.

The crude solution contains sodium chloride and sodium acetate, the latter being indicated in the drawing as Az. The crude solution is passed through anion exchanger A1 in such quantity that practically only chlorine ions will be bound. The solution leaving anion exchanger A1 and containing sodium hydroxide and sodium acetate then passes through cation exchanger K1 wherein the cations will be removed from the solution. The diluted acetic acid leaving cation exchanger K1 then passes through slightly basic anion exchanger A2 which serves to bind the acetic acid.

For regenerating ion exchangers A1, K1 and A2, a solution of sodium hydrosulfate is passed through cation exchanger K1 and will take up the sodium ions thereof. The sodium sulfate leaving cation exchanger K1 will be transformed into sodium hydroxide by the addition of barium hydroxide in causticizing device B whereby barium sulfate sludge will be formed and separated from the solution. The thus obtained sodium hydroxide solution is used for regenerating the strongly basic anion exchanger A1, and the solution of sodium chloride and sodium hydroxide which leaves anion exchanger A1 will pass through anion exchanger A2 and will remove the acetate therefrom. Due to separate regeneration of the two anion exchangers, the two anions, i.e. chlorine and acetate can be obtained separately.

Figure 6:
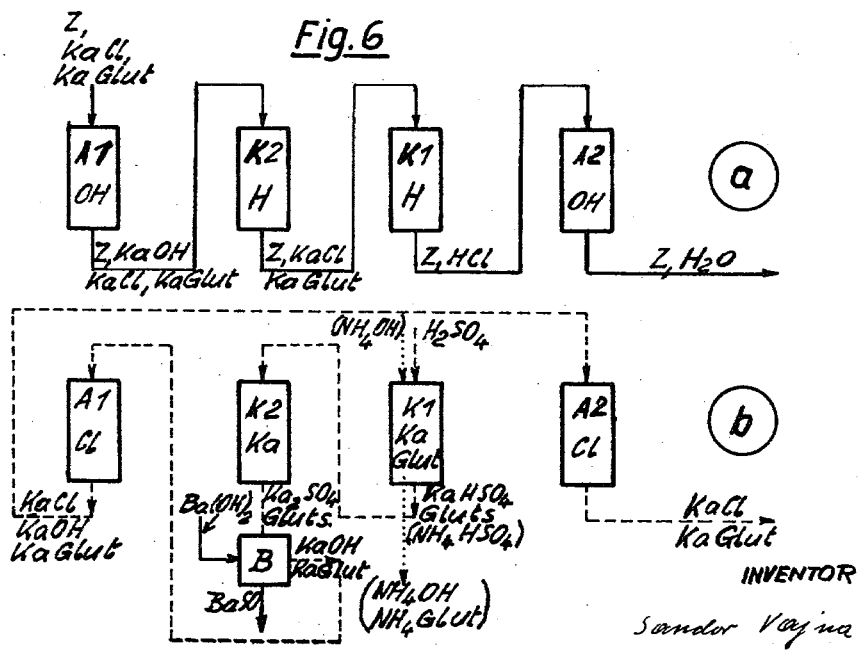

The modifications shown in FIG. 6 illustrates in part $a$ the desalting of the solution and in part $b$ the regeneration of the ion-exchangers. According thereto, a strongly basic anion exchanger A1, a slightly acid cation exchanger K2, a strongly acid cation exchanger K1 and a slightly basic anion exchanger A2 are provided. The solution which is to be desalted is the thin juice intermediary of the beet sugar manufacture which contains strong and weak anions which are indicated as chlorides and glutamates (shown in the drawing as Glut), and alkali metal cations. The quantities of exchange resins are so adjusted that in anion exchanger A1 only chlorides are bound and the thus formed free alkali metal hydroxide KaOH will be taken up in cation exchanger K2. Cation exchanger K1 takes up the remaining cations and also the glutamic acid. Finally, anion exchanger A2 takes up the remaining free hydrochloric acid.

Regeneration is carried out by passing sulfuric acid through cation exchanger K1 so as to partially spend the sulfuric acid. The solution leaving cation exchanger K1 contains $KaHSO_4$ and is used for regeneration of cation exchanger K2. Thereby a solution of $Ka_2SO_4$ is formed which is causticized at B with barium hydroxide and, after removal of the thus formed barium sulfate, will be a solution of alkali metal hydroxide KaOH. The hydroxide solution now serves for regenerating anion exchanger A1 and the solution leaving anion exchanger A1 and containing the excess hydroxide serves for regenerating anion exchanger A2. The solution leaving anion exchanger A2 contains the salts which were removed from the initial thin juice.

A modification according to which glutamic acid (Glut) is recovered from cation exchanger 1 is illustrated in dotted lines. Thereby, after desalting, cation exchanger K1 is treated with ammonium hydroxide which displaces the glutamic acid. From the solution and from the causticized hydroxide, ammonia may be boiled out and thus recovered. As described hereinabove, it is possible to use the chemicals employed in the regeneration of the ion exchangers substantially without losses so as to obtain close to the theoretical yield thereof.

The exhange resins may be conventional strongly and weakly active types, whereby the sequence of the pairs of exhangers may be reversed so that the same are arranged in the sequence: K1, A2, A1 and K2. It is particularly advantageous to use such exchange resins which include strongly and weakly active groups. For instance, a single cation exchanger with a phosphoric acid base resin may be used in place of exchangers K2 and K1, whereby the strongly acid hydrogen ions will take over the function of K2 and the weakly acid hydrogen ions the function of K1. Similarly, it is possible to use in place of A1 and A2 an anion exchanger which contains strongly and weakly basic groups. Only in the last mentioned case, i.e. with an anion exchanger containing strongly and weakly basic groups, the exchangers will be arranged in the following sequence: K1, A and K2.

The method of the present invention may also be advantageously combined with a per se known method which utilizes the ammonium cycle. Such combination is illustrated in FIG. 7 wherein part $a$ shows the desalting of the solution and part $b$ the regeneration of the exchangers.

Cation exchanger K1(2) may be a strongly acid or a weakly acid exchanger in which the cations of the solution are replaced by ammonium ions. The anions of the thus obtained solution are exchanged in anion exchanger A1 against OH ions. The thus formed ammonium hydroxide is bound in cation exchanger K2 and thus the desalting is completed. Cation exchanger K2 is regenerated with ammonium bicarbonate and the ammonium carbonate formed thereby is used for regenerating cation exchanger K1(2). The excess ammonium carbonate is driven off the thus obtained solution in distilling colum D and the remaining sodium carbonate is causticized at B with the addition of calcium hydroxide. The thus obtained sodium hydroxide serves for regenerating anion exchanger A1. Treatment of the residual hydroxide is carried out as illustrated in FIG. 2.

Part $b$ of FIG. 7 illustrates the recovery of ammonium bicarbonate by combining the last fractions obtained by regenerating cation exchanger K2 with the ammonium carbonate recovered by distillation and with carbon dioxide so as to reconstitute ammonium bicarbonate.

The cation exchanger which according to part $a$ of FIG. 7 during desalting is arranged as the third exchanger is charged with ammonium ions. If the first cation exchanger K1(2) is identical in composition with the third cation exchanger K2, then during the subsequent desalting step, the sequence may be reversed so that cation exchanger K2 now serves in place of cation exchanger K1(2) and vice versa. In this manner, one step of the process is saved since due to the treatment with ammonium bicarbonate, simultaneously with the charging with hydrogen ions, sodium carbonate is formed.

FIG. 8 again shows in part $a$ the desalting of a solution and in part $b$ the regeneration of the ion exchangers. The chlorine ions of the sodium chloride solution which is to be desalted are exchanged in anion exchanger A1 against carbonate ions. In slightly acid cation exchanger K2 sodium ions are exchanged against ammonium ions. The thus obtained ammonium carbonate is transformed with calcium hydroxide into ammonium hydroxide which then is passed through the second, slightly acid cation exchanger K2 which thus is charged with ammonium ions and can be used in the next desalting cycle without further treatment in the position of the second exchanger according to part $a$ of FIG. 8. The sodium ions-charged cation exchanger K2 is regenerated by passing ammonium bicarbonate therethrough and the thus obtained mixture of ammonium carbonate and bicarbonate solution is used for regenerating the anion exchanger. The solution leaving the anion exchanger is treated with a quantity of calcium hydroxide sufficient to convert the ammonium ions into ammonia. The ammonia is then bound in the cation exchanger similarly to what is shown in FIG. 1c.

The following examples are given as illustrative only of the present invention without limiting the same to the specific details of the examples.

*Example 1*

1.65 liters of softened sea water which contain 58 grams NaCl are passed through one liter of a strongly basic anion exchanger on polystyrene basis, type II. 2.2 liters of a solution are thus obtained which contain 43 grams $Na_2CO_3$, 11.8 grams $NaHCO_3$ and 2.9 grams NaCl. 160 grams of 20% milk of lime, corresponding to 32 grams CaO, are added to the thus obtained solution and the $CaCO_3$ precipitate formed thereby is removed by filtration.

The clear solution is now passed through 1.25 liters of a slightly acid cation exchanger, consisting of a condensation resin with free phenolic OH-groups, and thereby 2.5 liters of purified solution containing 2.9 grams NaCl and 2.0 grams NaOH are obtained, equal to about 10% of the initial salt content.

The anion exchanger is regenerated with 1.7 liters of a carbonate solution containing 80 grams $Na_2CO_3$ and 33.6 grams $NaHCO_3$. The regenerating solution leaving the anion exchanger contains 55.1 grams NaCl, 40 grams $Na_2CO_3$ and 16.8 grams $NaHCO_3$. This solution is causticized with 160 grams 20% milk of lime, corresponding to 32 grams CaO, and after removing the thus formed $CaCO_3$ precipitate by filtration, the solution is introduced into 1.25 liters of cation exchange resin of the type described above. The solution leaving the cation exchanger contains 55.1 grams NaCl and 2 grams NaOH.

The total of 2.5 liters of cation exchange resin are regenerated with 25 liters of a NaHCO₃ solution containing 84 grams NaHCO₃ per liter. After withdrawing the water displaced by the exchange resin, the first 1.7 liters are separated and to replace the loss of alkali, 5.3 grams of Na₂CO₃ are added so that this part of the solution will now contain 80 grams Na₂CO₃ and 33.6 grams NaHCO₃ and 33.6 grams NaHCO₃ and may be used for regenerating the anion exchanger. 1.5 liters of water are added to the remaining 23.5 liters of solution and the formed Na₂CO₃ is reconverted into NaHCO₃ by introducing CO₂ into the solution.

*Example II*

A sugar solution taken from the second evaporator of a beet sugar plant contains 35% dry substance, including 60 mg. per liter CaO and 0.13 equ./l. of ionizable non-sugars. 5.6 liters of this solution are treated with one liter of a strongly basic anion exchange resin on polystyrene basis thereby forming 6.1 liters of a solution containing 700 mequ. alkali hydroxide and 26 mequ. of unchanged alkali salts of the initial sugar solution. The solution obtained after passage through the anion exchanger is treated with 1.8 liters of a very slightly acid cation exchange resin with the active groups

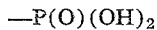

—P(O)(OH)₂

In this manner a solution or juice is obtained which contains 20 mequ. alkali hydroxide and 26 mequ. alkali salts. By carrying out a further treatment with 15 milliliters of slightly acid cation exchange resin containing active COOH groups, it is possible to remove the residual alkali and to obtain a juice containing only about 5% of its initial content of ionizable constituents.

This juice is obtained as described above from a thin juice which had been softened prior to evaporation. For this purpose 30 milliliters of a cation exchanger of the polystyrene-sulfonic acid type are required.

The anion exchanger is regenerated with 1.83 liters of an alkali hydroxide solution containing 1.75 val. alkali hydroxide. A solution is formed which, in addition to the anions of the juice now removed from the anion exchange resin, will also contain the excess of alkali hydroxide amounting to 1.05 val. The solution is now passed through 1.7 liters of a very slightly acid cation exchanger of the type described above which will bind 1.0 val. of the alkali hydroxide. The thus obtained solution contains 0.7 val. alkali salts and 30 mval. free hydroxide, it is passed through the softener and takes up the alkaline earth metal ions therefrom.

The two very slightly acid cation exchange resin portions which amount to a total of 3.5 liters are regenerated with 35 liters of a 1 N NaHCO₃ solution. After removal of the water displaced from the exchange resins, the first 1.55 liters are separated and, to replace loss of alkali, 5.3 grams of Na₂CO₃ are added. Thereafter, the solution is causticized by adding 280 ml. 20% milk of lime. Finally, the filtered solution thus obtained is used for regenerating the anion exchange resin.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an ion exchange process for at least partially desalting a salt-containing aqueous solution which is free of polyvalent cations by replacing anions of said aqueous salt solution with hydroxyl ions, and cations of said aqueous solution with hydrogen ions, and for regenerating the cation and anion exchangers used therefor, the steps of passing a substance selected from the group consisting of polyvalent acids and acid salts thereof through a cation exchanger so as to replace therein cations with hydrogen ions thus regenerating said cation exchanger and forming a solution containing the thus replaced cations; passing the thus formed cations-containing solution through an anion exchanger so as to replace therein anions with polyvalent acid ions thus regenerating said anion exchanger; passing said salt-containing aqueous solution through the regenerated anion exchanger so as to replace the anions of said salt containing solution with ions of said polyvalent acid; treating the ions of said polyvalent acid-containing solution derived from said anion exchanger with an hydroxide of an alkaline earth metal so as to precipitate an alkaline earth metal salt of said polyvalent acid and to replace in said solution polyvalent acid ions with hydroxyl ions; and passing the thus-formed alkali metal ions-containing solution through the regenerated cation exchanger so as to replace in said solution alkali metal with hydrogen.

2. In an ion exchange process for at least partially desalting a salt-containing aqueous solution which is free of polyvalent cations by replacing anions of said aqueous salt solution with hydroxyl ions, and cations of said aqueous solution with hydrogen ions, and for regenerating the cation and anion exchangers used therefor, the steps of passing an aqueous solution of a substance selected from the group consisting of polyvalent acids and acid salts thereof through a cation exchanger so as to replace therein cations with hydrogen ions thus regenerating said cation exchanger and forming a solution containing the thus replaced cations; passing the thus formed cations-containing solution through an anion exchanger so as to replace therein anions with polyvalent acid ions thus regenerating said anion exchanger; passing said salt-containing aqueous solution through the regenerated anion exchanger so as to replace the anions of said salt containing solution with ions of said polyvalent acid; treating the ions of said polyvalent acid-containing solution derived from said anion exchanger with an excess amount of an hydroxide of an alkaline earth metal so as to precipitate an alkaline earth metal salt of said polyvalent acid and to replace in said solution polyvalent acid ions with hydroxyl ions; introducing into the thus formed solution a polyvalent acid in an amount sufficient to precipitate residual dissolved alkaline earth metal therefrom; and passing the thus-formed alkali metal ions-containing solution through the regenerated cation exchanger so as to replace in said solution alkali metal with hydrogen.

3. In an ion exchange process for at least partially desalting a salt-containing aqueous solution which is free of polyvalent cations by replacing anions of said aqueous salt solution with hydroxyl ions, and cations of said aqueous solution with hydrogen ions, and for regenerating the cation and anion exchangers used therefor, the steps of passing a substance selected from the group consisting of polyvalent acids and acid salts thereof through a cation exchanger so as to replace therein cations with hydrogen ions thus regenerating said cations exchanger and forming a solution containing the thus replaced cations; passing the thus formed cations-containing solution through an anion exchanger so as to replace therein anions with polyvalent acid ions thus regenerating said anion exchanger thus forming a solution of salts of said polyvalent acid; treating the thus formed solution with an hydroxide of an alkaline earth metal so as to precipitate an alkaline earth metal salt of said polyvalent acid and to replace in said solution polyvalent acid ions with hydroxyl ions; passing the thus formed hydroxyl ions-containing solution through said cation exchanger prior to regeneration of the same; passing said salt-containing aqueous solution through the regenerated anion exchanger so as to replace the anions of said salt containing solution with ions of said polyvalent acid; treating the ions of said polyvalent acid-containing solution derived from said anion exchanger with an hydroxide of an alkaline earth metal so as to precipitate an alkaline earth metal salt of said polyvalent acid and to replace in said solution polyvalent acid ions with hydroxyl ions; and passing the thus-formed alkali metal ions-containing solution through the regenerated cation exchanger so as to replace in said solution alkali metal with hydrogen.

4. In an ion exchange process for at least partially desalting a salt-containing aqueous solution which is free of polyvalent cations by replacing anions of said aqueous salt solution with hydroxyl ions, and cations of said aqueous solution with hydrogen ions, and for regenerating the cation and anion exchangers used therefor, the steps of passing a substance selected from the group consisting of polyvalent acids and acid salts thereof through at least one cation exchanger so as to replace therein cations with hydrogen ions thus regenerating the same and forming a solution containing the thus replaced cations; treating the thus formed solution with an alkaline earth metal hydroxide so as to precipitate an alkaline earth metal salt of said polyvalent acid and to replace polyvalent acid ions of said solution with hydroxyl ions; passing the thus formed hydroxyl ions-containing solution through at least one anion exchanger, thus regenerating the same and passing said salt-containing aqueous solution through the thus regenerated anion and cation exchangers so as to replace anions of said salt-containing aqueous solution with hydroxyl ions and cations of said salt with hydrogen ions.

5. In an ion exchange process for at least partially desalting a salt-containing aqueous solution which is free of polyvalent cations by replacing anions of said aqueous salt solution with hydroxyl ions, and cations of said aqueous solution with hydrogen ions, and for regenerating the cation and anion exchangers used therefor, the steps of passing a substance selected from the group consisting of polyvalent acids and acid salts thereof through a cation exchanger so as to replace therein cations with hydrogen ions thus regenerating said cation exchanger and forming a solution containing the thus replaced cations; treating the thus formed solution with an alkaline earth metal hydroxide so as to precipitate an alkaline earth metal salt of said polyvalent acid and to replace polyvalent acid ions of said solution with hydroxyl ions; regenerating the anion exchanger with an excess of the thus formed hydroxyl ions-containings solution; passing the excess hydroxyl ions-containing solution from the anion exchanger through the cation exchanger for regeneration of said cation exchanger so as to bind at least a portion of said excess hydroxyl ions therein; and passing said salt-containing aqueous solution through the thus regenerated anion exchanger and the regenerated cation exchanger so as to replace anions of said salt-containing aqueous solution with hydroxyl ions and cations of said salt with hydrogen ions.

6. In an ion exchange process for at least partially desalting a salt-containing aqueous solution which is free of polyvalent cations by replacing anions of said aqueous salt solution with hydroxyl ions, and cations of said aqueous solution with hydrogen ions, and for regenerating the cation and anion exchangers used therefor, the steps of passing a substance selected from the group consisting of polyvalent acids and acid salts thereof through a strongly acid cation exchanger so as to replace therein cations with hydrogen ions thus regenerating said cation exchanger and forming a solution containing the thus replaced cations; treating the thus formed solution with an alkaline earth metal hydroxide so as to precipitate an alkaline earth metal salt of said polyvalent acid and to replace polyvalent acid ions of said solution with hydroxyl ions; passing said hydroxyl ions-containing solution first through a strongly basic and then through a slightly basic anion exchanger, thus regenerating the same and passing said salt-containing aqueous solution through the thus regenerated anion and cation exchangers so as to replace anions of said salt-containing aqueous solution with hydroxyl ions and cations of said salt with hydrogen ions.

7. A method according to claim 4 wherein said salt-containing aqueous solution is passed, in the indicated sequence, through a strongly basic anion exchanger, a slightly acid cation exchanger, a strongly acid cation exchanger and a slightly basic anion exchanger; and wherein the solution for regenerating the ion exchangers passes, in the indicated sequence through a strongly acid cation exchanger, a slightly acid cation exchanger, a strongly basic anion exchanger and a slightly basic anion exchanger.

8. A method according to claim 4 wherein said salt-containing aqueous solution is passed, in the indicated sequence, through a strongly acid cation exchanger, a slightly basic anion exchanger, a strongly basic anion exchanger and a slightly acid cation exchanger; and wherein the solution for regenerating the ion exchangers passes, in the indicated sequence through a strongly acid cation exchanger, a slightly acid cation exchanger, a strongly basic anion exchanger and a slightly basic anion exchanger.

9. A method according to claim 5 wherein said salt-containing solution and said hydroxyl ions-containing solution derived from said anion exchanger are passed simultaneously through different portions of the cation exchanger for respectively desalting and binding excess hydroxyl ions of said solutions.

10. In an ion exchange process for at least partially desalting a salt-containing aqueous solution which is free of polyvalent cations by replacing anions of said aqueous salt solution with hydroxyl ions, and cations of said aquous solution with hydrogen ions, and for regenerating the cation and anion exchangers used therefor, the steps of passing a solution of a predetermined amount of a substance selected from the group consisting of polyvalent acids and acid salts thereof through a cation exchanger, said predetermined amount being at least twice the equivalent of the hydrogen ion capacity of said cation exchanger, so as to replace therein cations with hydrogen ions thus regenerating said cation exchanger and forming a first portion of a solution containing the thus replaced cations and a second portion substantially free of cations from said cation exchanger; passing the thus formed cations-containing first portion of said solution through an anion exchanger so as to replace therein anions with polyvalent acid ions thus regenerating said anion exchanger; adding polyvalent acid to said second portion of said solution so as to reconstitute the same for subsequent regeneration of said cation exchanger therewith; passing said salt-containing aqueous solution through the regenerated anion exchanger and the regenerated cation exchanger so as to replace the anions of said salt containing solution with ions of said polyvalent acid and cations of said salt with hydrogen ions; and treating the ions of said polyvalent acid-containing solutions derived from said anion exchanger with an hydroxide of an alkaline earth metal so as to precipitate an alkaline earth metal salt of said polyvalent acid and to replace in said solution polyvalent acid ions with hydroxyl ions.

11. A method according to claim 1 wherein said polyvalent acid is carbonic acid.

12. A method according to claim 1 wherein said polyvalent acid is sulfurous acid.

13. A method according to claim 1 wherein said polyvalent acid is sulfuric acid.

14. A method according to claim 1 wherein said polyvalent acid is phosphoric acid.

15. In an ion exchange process for at least partially desalting a salt-containing aqueous solution including colloidal impurities which is free of polyvalent cations by replacing anions of said aqueous salt solution with hydroxyl ions, and cations of said aqueous solution with hydrogen ions, and for regenerating the cation and anion exchangers used therefor, the steps of passing a substance selected from the group consisting of polyvalent acids and acid salts thereof through a cation exchanger so as to replace therein cations with hydrogen ions thus regenerating said cation exchanger and forming a solution containing the thus replaced cations; passing the thus formed cations-containing solution through an anion exchanger so as to replace therein anions with polyvalent acid ions thus regenerating said anion exchanger; passing said salt-containing aqueous solution through the regenerated anion exchanger so as to replace the anions of said salt containing solution with ions of said polyvalent acid; treating the ions of said polyvalent acid-containing solution derived from said anion exchanger with an hydroxide of an alkaline earth metal so as to precipitate said colloidal impurities and an alkaline earth metal salt of said polyvalent acid and to replace in said solution polyvalent acid ions with hydroxyl ions; and passing the thus-formed alkali metal ions-containing solution through the regenerated cation exchanger so as to replace in said solution alkali metal with hydrogen.

16. A method according to claim 15 wherein treatment of the ions of said polyvalent acid-containing solution derived from said anion exchanger is carried out with an amount of hydroxide of an alkaline earth metal which is greater than the amount required for precipitation of said polyvalent acid; and wherein the excess portion of alkaline earth metal hydroxide is then precipitated by the addition of polyvalent acid.

17. A method according to claim 1, wherein said salt-containing aqueous solution includes polyvalent cations, including the step of treating said salt-containing solution prior to passage of the same through the regenerated anion exchanger with a portion of polyvalent acid-containing solution derived from said anion exchanger so as to precipitate and remove polyvalent cations from said initial salt-containing aqueous solution prior to introduction of the latter into said anion exchanger.

References Cited by the Examiner
UNITED STATES PATENTS 2,736,635 2/56 Haywood _____ 210—38 X
2,988,463 6/61 Vajna _____ 210—30

OTHER REFERENCES

Mantell: "Adsorption," second edition (1951) McGraw-Hill Book Co., Inc., New York, chapter 10, pages 185–189 particularly relied on.

MORRIS O. WOLK, *Primary Examiner.*

CARL F. KRAFFT, *Examiner.*